US008800849B2

(12) United States Patent
Jansen et al.

(10) Patent No.: US 8,800,849 B2
(45) Date of Patent: Aug. 12, 2014

(54) DIRECT BONDING OF HEAT CONDUCTING FOAM AND SUBSTRATES

(75) Inventors: Eugene Jansen, Dumfries, VA (US); Scott M. Maurer, Haymarket, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 232 days.

(21) Appl. No.: 13/431,361

(22) Filed: Mar. 27, 2012

(65) Prior Publication Data

US 2012/0282454 A1 Nov. 8, 2012

Related U.S. Application Data

(60) Provisional application No. 61/481,815, filed on May 3, 2011.

(51) Int. Cl.
*B23K 31/00* (2006.01)
*B29C 65/02* (2006.01)
*B32B 37/00* (2006.01)

(52) U.S. Cl.
USPC .......................... 228/121; 228/183; 156/145

(58) Field of Classification Search
None
See application file for complete search history.

(56) References Cited

U.S. PATENT DOCUMENTS

| | | | | |
|---|---|---|---|---|
| 3,288,573 | A | * | 11/1966 | Abos .............................. 428/568 |
| 4,325,734 | A | * | 4/1982 | Burrage et al. ................. 419/60 |
| 4,347,083 | A | * | 8/1982 | Sara ............................... 419/11 |
| 5,095,708 | A |   | 3/1992 | Kalina |
| 5,100,049 | A | * | 3/1992 | Divecha et al. ................ 228/198 |
| 5,113,052 | A | * | 5/1992 | Gabriel ....................... 219/85.22 |
| 5,480,676 | A |   | 1/1996 | Sonuparlak et al. |
| 6,259,165 | B1 |   | 7/2001 | Brewington |
| 6,694,740 | B2 |   | 2/2004 | Nayar |
| 6,780,505 | B1 | * | 8/2004 | Klett et al. .................... 428/367 |
| 6,838,202 | B2 |   | 1/2005 | Brady et al. |
| 7,472,549 | B2 |   | 1/2009 | Brewington |
| 2003/0000486 | A1 | * | 1/2003 | Ott et al. ..................... 123/41.31 |
| 2003/0154865 | A1 | * | 8/2003 | Zornes ........................... 96/143 |
| 2005/0008890 | A1 |   | 1/2005 | Raghunathan et al. |
| 2007/0119907 | A1 | * | 5/2007 | Rodhammer ............... 228/122.1 |
| 2007/0228109 | A1 | * | 10/2007 | Smith et al. ................... 228/176 |
| 2007/0284095 | A1 |   | 12/2007 | Wang et al. |
| 2008/0166492 | A1 |   | 7/2008 | Lu et al. |

(Continued)

OTHER PUBLICATIONS

International Search Report for international application No. PCT/US2012/030853, dated Jul. 3, 2012 (5 pages).

(Continued)

*Primary Examiner* — Kiley Stoner
(74) *Attorney, Agent, or Firm* — Hamre, Schumann, Mueller & Larson, P.C.

(57) ABSTRACT

A technique for joining porous foam material, such as graphite, metal or ceramic foam, to a substrate is described. The substrate can be metal, a thermoset plastic or a composite material. The substrate has a melting point below that of the foam material. The two are joined together by using the foam to apply heat locally at the surface of the substrate. Some or all of the foam is heated to the appropriate temperature at or above the melting point of the substrate material. The foam and the substrate are then brought together, with the heat from the foam melting or softening the substrate material so that the substrate material infuses into the pores of the foam. As the foam cools below the melting point temperature, the substrate material solidifies to create a mechanical bond between the foam and the substrate.

8 Claims, 4 Drawing Sheets

(56) References Cited

U.S. PATENT DOCUMENTS

| | | | |
|---|---|---|---|
| 2010/0055478 A1* | 3/2010 | Chaumat et al. | 428/450 |
| 2010/0181054 A1* | 7/2010 | Nagurny et al. | 165/167 |
| 2012/0177488 A1* | 7/2012 | Corman | 415/200 |

OTHER PUBLICATIONS

Written Opinion of the International Searching Authority for international application No. PCT/US2012/030853, dated Jul. 3, 2012 (4 pages).

"Collision Repair Solutions," located online at http://3mcollision.com/products, accessed Mar. 26, 2012 (2 pages).

"500° F Thermally Conductive Epoxies," located online at http://www.cotronics.com/vo/cotr/ea_thermallyconductive.htm, accessed Mar. 26, 2012 (3 pages).

"Foams," located online at http://www.s-bond.com/SolderJointStructures/Foams.htm, accessed Mar. 26, 2012 (2 pages).

U.S. Appl. No. 13/365,456, filed Feb. 3, 2012 (35 pages).
U.S. Appl. No. 13/365,459, filed Feb. 3, 2012 (36 pages).
U.S. Appl. No. 13/365,460, filed Feb. 3, 2012 (34 pages).
U.S. Appl. No. 13/365,461, filed Feb. 3, 2012 (32 pages).

* cited by examiner

DIRECT BONDING OF HEAT CONDUCTING FOAM AND SUBSTRATES

FIELD

This disclosure relates to bonding heat conducting foam material to substrates including but not limited to metal, thermoplastic or composite substrates.

BACKGROUND

With reference to FIG. 1, current joining methods between an aluminum or non-metallic substrate 2 and graphite foam 4 involve the introduction of a bond material 6, such as resin epoxies or thermal compounds, between the substrate and the graphite foam to produce a bond. The introduction of a bond material often results in negative chemical, electrical and thermal effects to the interfacial joint area. Bonding materials can add an additional chemical component that can increase susceptibility to corrosion, erosion or fouling. In addition, bonding materials can inhibit the flow of heat and electrons between the substrate and the graphite foam, thereby increasing thermal and/or electrical resistance of the resulting assembly. Furthermore, bond material is expensive, difficult to apply evenly, and requires a labor intensive process

SUMMARY

A technique is described for joining heat conducting, porous foam material to a substrate as a seamless joint without the introduction of bonding compounds. The heat conducting, porous foam material can be, for example, graphite foam, a metal foam such as aluminum, copper, bronze or titanium foam, carbon foam, a ceramic such as Silicon Carbide (SiC) foam, and other types of heat conducting foams that have a higher melting temperature than the substrate. The substrate can be, for example, a metal including, but not limited to, aluminum and aluminum alloys, copper and copper alloys, steel and steel alloys, and the like, a thermoset thermally conductive plastic or a thermally conductive composite material.

The substrate has a melting point below that of the heat conducting foam material. The two can be joined together using careful application of heat locally at the surface of the substrate.

Localized heating of the substrate surface by the graphite foam helps to retain material properties of heat treated substrate materials by minimizing the surface heating effects in the substrate. For example, an aluminum alloy such as AL6063-T6 has certain heat treatments to temper the material. If these aluminum alloys are brazed inside a furnace, the beneficial strength properties of the temper would be eliminated. By applying localized heating to the substrate, most or all of the material properties will be retained.

The favorable heat transfer characteristics of the heat conducting foam material can be used to apply heat at the surface of the substrate. Some or all of the foam is heated to the appropriate temperature at or above the melting point of the substrate material. Heating of the foam material can be accomplished in any manner one finds suitable. For example, the foam could be heated non-locally or globally, for example in an oven or furnace, to the desired temperature. In addition, the foam could be heated locally near the substrate interface in an in-situ type process. In addition, the foam could be resistively heated by passing a current through the foam, either locally or non-locally. Heat can also be applied, globally or locally, to the foam and/or the substrate upon cooling of the substrate.

The heated foam and the substrate can then be brought together which melts or softens the substrate material so that the substrate material infuses into the pores of the foam. The two can be held together while the foam cools below the melting point temperature, so that the substrate material solidifies to create a mechanical bond between the foam and the substrate.

In some circumstances, minimal or no pressing force may be necessary if it is determined that gravity is sufficient to ensure that the substrate material infuses into the pores of the foam. In this case, the heated foam and the substrate can be brought together into contact with each other or close enough to one another so that the heat from the heated foam melts or softens the substrate material, with gravity causing the substrate material to infuse into the pores of the foam. In addition, combinations of pressing and non-pressing can be used.

In one embodiment, the foam material can be provided with a pattern, for example via cutting, on its interfacial bonding side to aid with the bond. For example, the foam can be provided with a fin structure like pattern, such as corrugated fins, a diamond, round, square, triangular pattern, or other pattern to help mold into the substrate to enhance the mechanical bond. In addition to or separate from a pattern, a "lock and key" type pattern can be provided on the foam material and the substrate which fit together when the foam material and the substrate are brought together to enhance the mechanical bond.

The substrate material is effectively infused within the foam material, which settles in the open cell structure of the foam. This creates a seamless bond between the foam and substrate where both parent materials exist as a composite structure at the bond line. The bond serves to maximize electrical and thermal conductivity between the parent materials while eliminating the negative chemical effect of introducing a bonding material.

In one embodiment, a method of direct bonding a porous heat conducting foam material to a substrate includes heating a portion of the porous heat conducting foam that is intended to be in contact with the substrate to a temperature at or above the melting point temperature of the substrate. The heated portion of the foam material and the substrate are then brought together so that a portion of the substrate is heated sufficiently to melt or soften enough to infuse into pores of the foam material. The foam material and the substrate can be held in direct contact with each other, with gravity causing the infusion of the substrate material into the pores of the foam material, and/or the foam material and the substrate can be pressed together during this stage. While together, the heated portion of the foam material is allowed to cool below the melting point temperature so that the heated portion of the substrate material solidifies, thereby creating a mechanical bond between the substrate and the graphite foam.

A product that results from this direct bonding technique includes the porous heat conducting foam material directly bonded to the substrate at an interface with no bond material between the porous foam material and the substrate, and wherein the substrate material is infused into pores of the porous foam at the interface.

This joining technique reduces material and installation costs by eliminating the need for bond material. The chemistry at the joint is less complicated and there is lower chemical incompatibility concern. Electrical resistance is lowered and thermal conductivity is increased. Structural integrity is retained as are material properties of the substrate and the foam material. Mechanical stresses encountered due to differing Coefficients of Thermal Expansion (CTEs) could be eliminated by employing the localized joining process in sections to allow gaps and metal expansion or contraction encountered in various thermal processes. The foam material may also be machined into a composite structure to allow for greater global expansion/contraction without causing plastic deformation of the foam material or substrate at or near the bond.

This joining technique and resulting product can be used in a large number of different applications. One exemplary application is in graphite foam heat exchangers.

DRAWINGS

DETAILED DESCRIPTION

Figure 1:
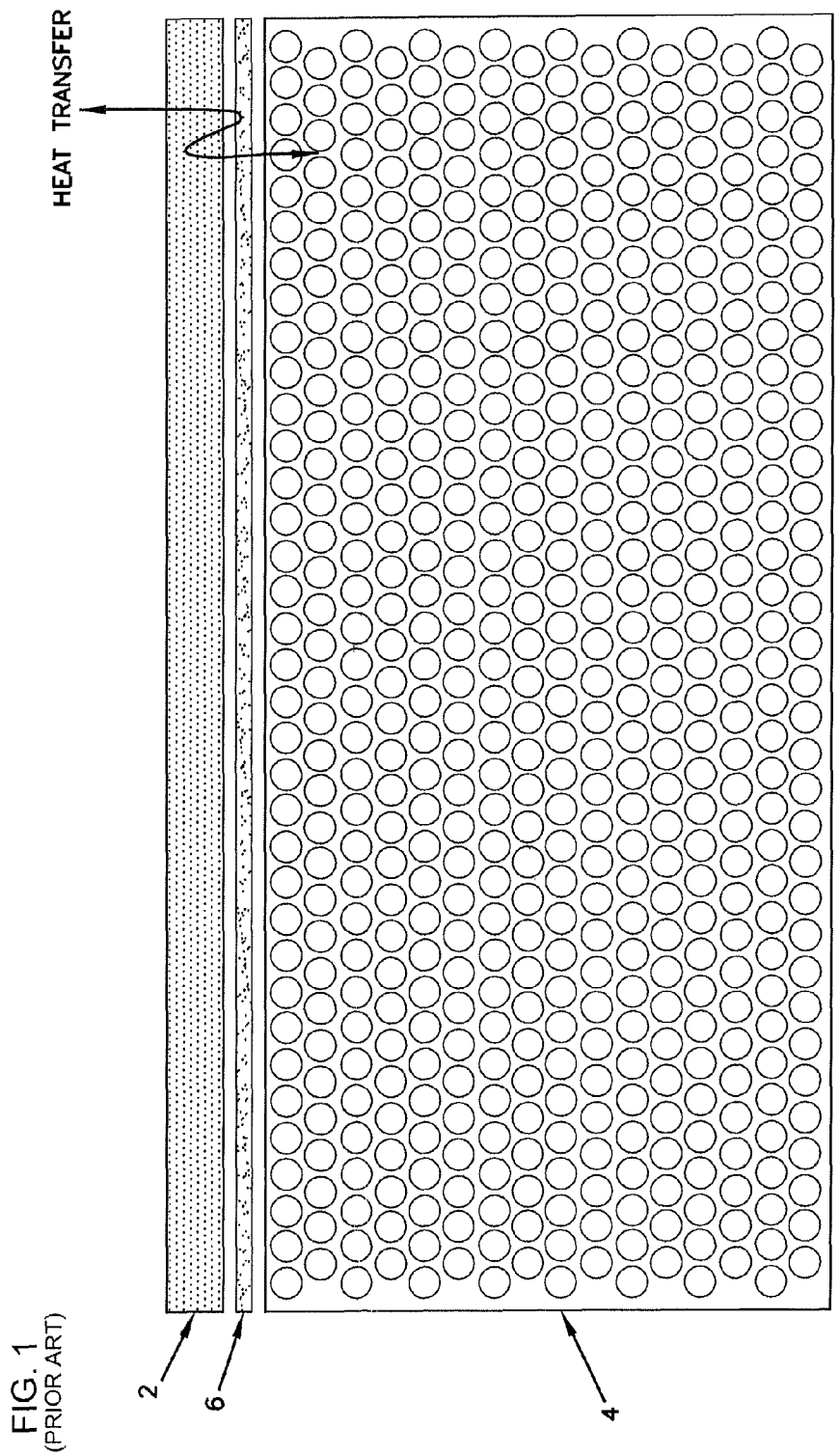
FIG. 1 illustrates a prior art technique of bonding graphite foam to a substrate using an intermediate bond material.
Figure 2:
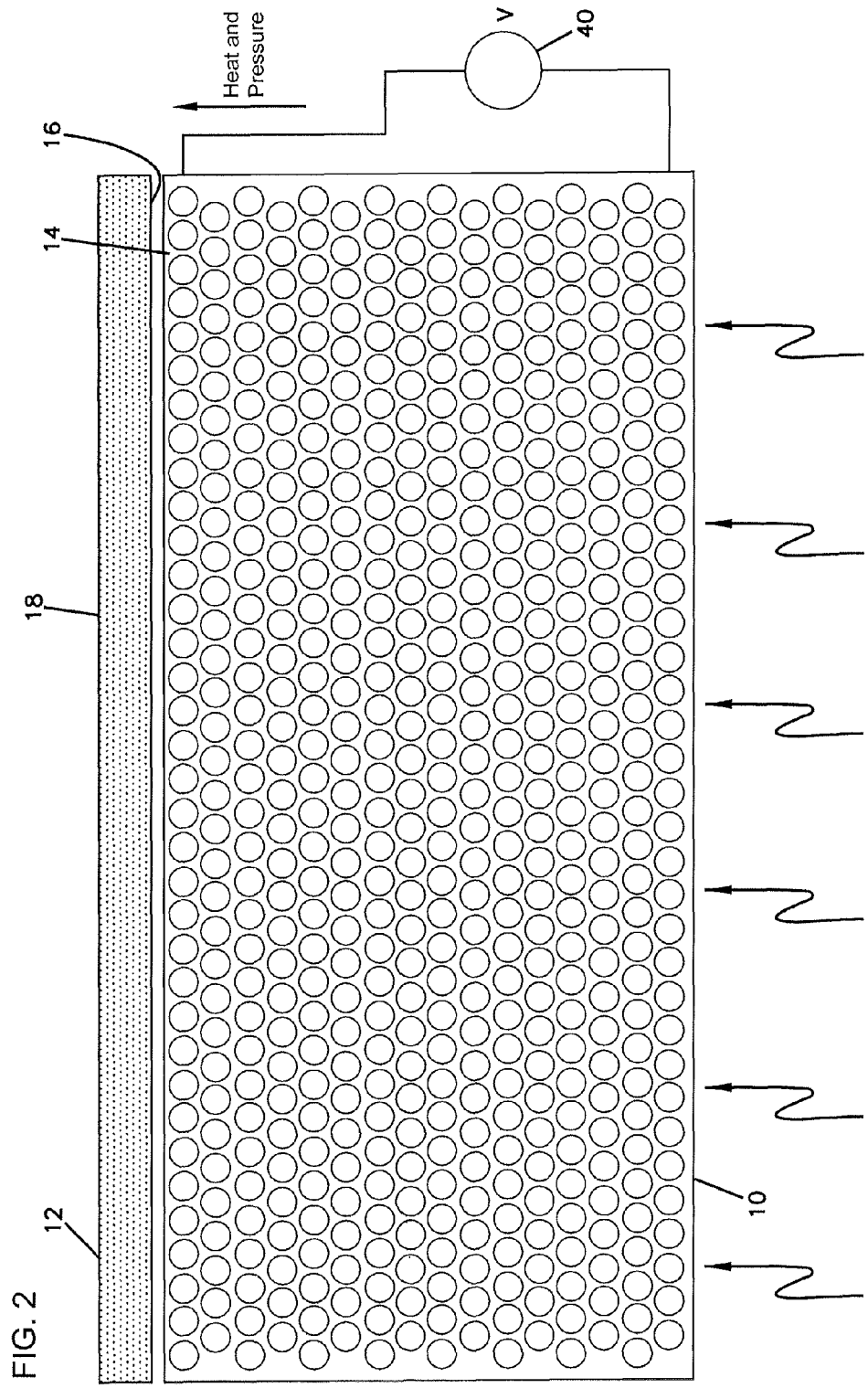
FIG. 2 illustrates a technique of directly bonding graphite foam to a substrate.

With reference to FIG. 2, a technique of directly bonding porous, heat conducting foam 10 to a substrate 12 is illustrated. The foam 10 is a piece or section of porous, heat conducting foam material having a surface or portion 14 thereof that is intended to be directly bonded to a surface or portion 16 of the substrate. The surfaces 14, 16 are illustrated as being of the same dimension. However, the surface 14 can be smaller or larger than the surface 16.

In one embodiment, the foam 10 is graphite foam. However, the heat conducting, porous foam material can be, for example, metal foam such as aluminum, copper, bronze or titanium foam, carbon foam, ceramic foam such as Silicon Carbide (SiC) foam, and other types of heat conducting foams that have a higher melting temperature than the substrate.

The foam 10, at least where it is intended to face the surface 16 of the substrate 12, is heated to a temperature at or above the melting point of the material of the substrate. When brought together, the foam transfers heat to the substrate surface, allowing precise heating locally at the substrate surface. The foam and the substrate are held together until the material of the substrate adjacent the surface 16 melts or is soft enough to have material thereof infuse into the pores of the foam and creates a mechanical bond when the substrate material and the foam cool and the substrate material solidifies. Ideally, the foam will seal with the surface 16 and create an impermeable interface between the substrate and the foam.

The foam material and the substrate can be held in direct contact with each other, with gravity primarily causing the infusion of the substrate material into the pores of the foam material. Alternatively, the foam material and the substrate can be pressed together during this stage using pressure. Combinations of holding the foam material and the substrate in direct contact with each other and pressing the foam material and the substrate together using pressure can be used.

Figure 3:
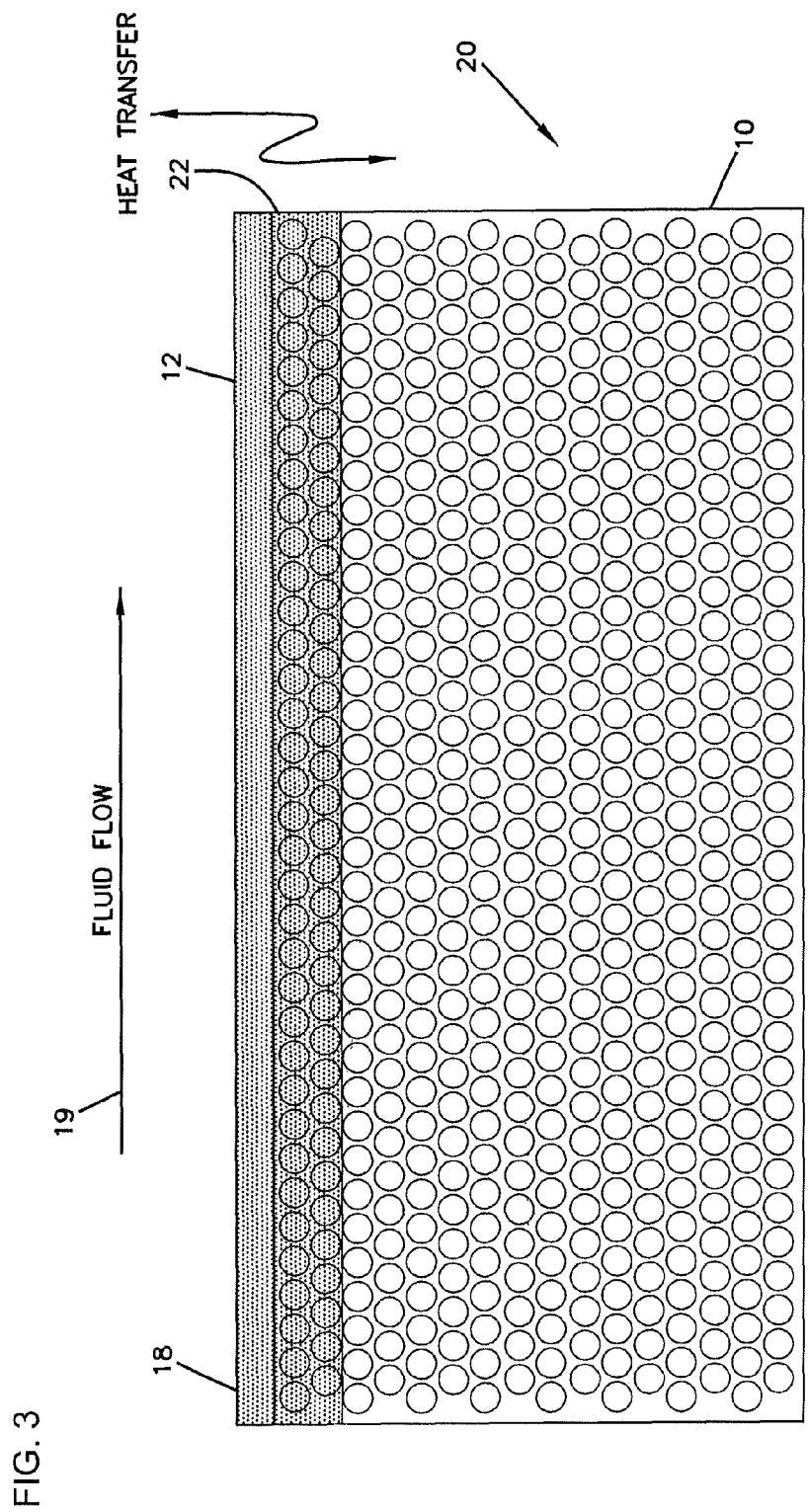
FIG. 3 illustrates the graphite foam direct bonded to the substrate.

FIG. 3 illustrates a product 20 that results from direct bonding the graphite foam 10 and the substrate. At the joint region 22 between the two, it can be seen that a portion of the substrate material has infused into the pores of the graphite foam. This helps to ensure a strong mechanical bond between the graphite foam and the substrate. As evident from FIG. 3, there is no bond material or third material in the interfacial joint region between the parent materials of the graphite foam and the substrate.

In another embodiment, a third material could be used that enhances the infusion of the substrate material into the pores of the foam and allow localized bonding through a localized "brazing" process. This third material could be, for example, a spray coating or braze alloy that could be applied to the graphite foam, heated and then held against the substrate. The result would be a third material in an interfacial region that could have benefits to substrates such as an aluminum alloy that may not effectively bond with the foam. The third material can act like a "primer" to allow a better bond.

The graphite foam 10 is known to have material properties, such as high thermal conductivity and low weight, that make it suitable for use in a number of thermal and non-thermal management applications including, but not limited to, power electronics cooling systems, transpiration/evaporative cooling systems, heat exchangers, radiators, space radiators, cold plates, EMI and RF shielding systems, thermal and acoustic signature management systems, Ocean Thermal Energy Conversion systems, power generation systems, alternative energy systems, refrigeration systems, cryogenics systems, liquid natural gas regasification systems, desalination systems, and water production systems.

The substrate 12 can be any substrate made from any material that one may wish to directly bond graphite foam to. Examples of substrates include, but are not limited to, metal substrates made from aluminum and aluminum alloys, copper and copper alloys, steel and steel alloys, and the like, substrates made from thermoset conductive plastic materials, or substrates made from composite materials.

Figure 4:
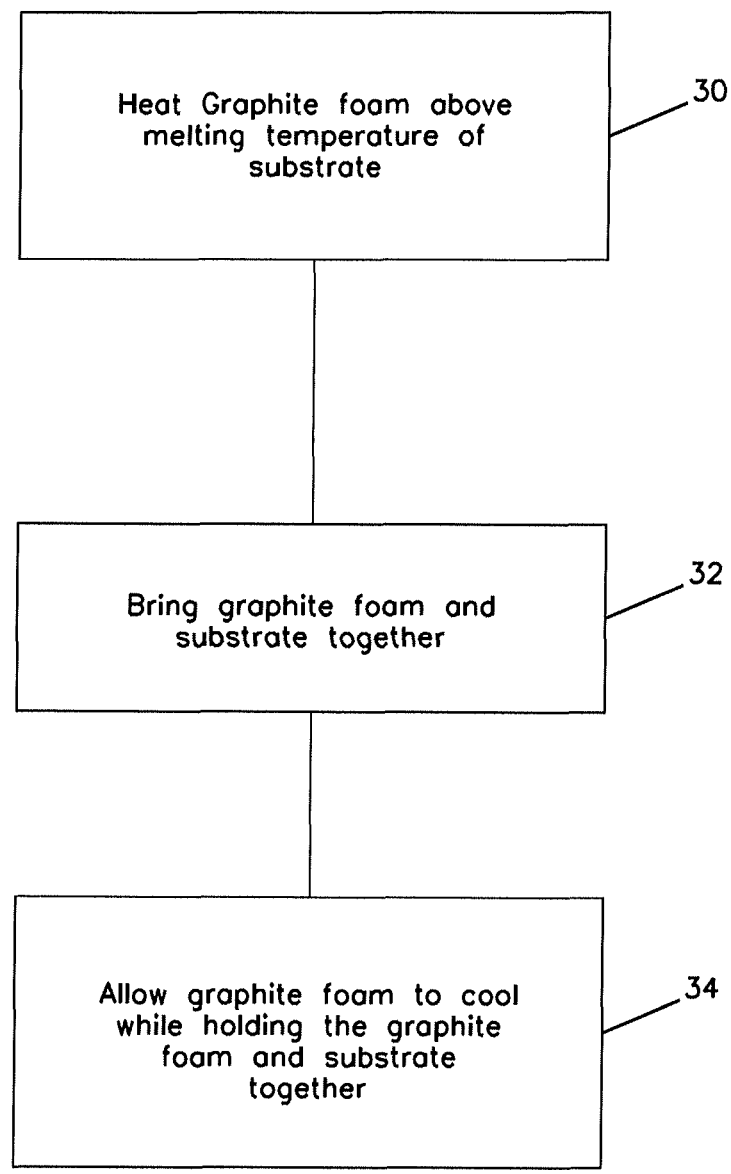
FIG. 4 is a flow chart of steps involved in the direct bonding technique illustrated in FIGS. 2 and 3.

With reference to FIG. 4, steps in the direct bonding process are illustrated. Initially, in step 30, the graphite foam is heated to a temperature at or above the melting point of the substrate. Heating of the foam material can be accomplished in any manner one finds suitable. For example, the foam could be heated non-locally, for example in an oven or furnace, to the desired temperature. In addition, the foam could be heated locally near the substrate interface in an in-situ type process using a heat source such as an open flame. In addition, as shown in FIG. 2, the foam 10 could be resistively heated by passing a current through the foam from a power source 40, either locally or non-locally.

In one embodiment, only the portion of the foam that is intended to face the surface of the substrate is heated to a temperature at or above the melting point of the substrate. In another embodiment, the entire foam piece is heated, with at least the portion intended to face the surface of the substrate, and possibly the entire foam piece, being heated a temperature at or above the melting point of the substrate.

In step 32, after the foam has been heated sufficiently, the foam and the substrate are brought together into contact with each other, with or without pressure as mentioned previously. When brought together, the foam transfers heat to the substrate surface which locally heats the substrate surface. The material of the substrate adjacent the surface 16 melts or becomes soft enough to have material thereof infuse into the pores of the foam. In step 34, the foam and the substrate continue to be held together while the temperature cools. As the temperature cools below the melting point, the substrate material solidifies, thereby creating a mechanical bond between the substrate and the foam.

With reference to FIGS. 2 and 3, in a further embodiment, the substrate 12 could be cooled on the surface 18 opposing the mating surfaces 14 and 16. The temperature of the surface 18 could be regulated just below the melting point of the substrate material. Cooling could occur by way of single phase fluid flow 19 across the surface, evaporative cooling, or other cooling methods. Regulating the temperature of the substrate 12 will ensure that the superstructure of the material is maintained along with important mechanical properties. Using this cooling technique, the method of heating does not require as much precision, the joint 22 will have tighter dimensional control, and there is less likelihood of catastrophic failure such as material collapse, surface penetration, destruction of material properties, etc.

This direct bonding technique between heat conducting foam and a substrate, and resulting product, has use in a number of different applications. One non-limiting example is in graphite foam heat exchangers that can be employed in any number of applications, including but not limited to, low thermal driving force applications such as Ocean Thermal Energy Conversion, other power generation applications, and non-power generation applications such as refrigeration and cryogenics. The process can also be used to produce composite structures used in non-thermal management applications.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of direct bonding a porous foam to a substrate, comprising:
    heating a portion of the porous foam that is intended to be in contact with the substrate to a temperature at or above the melting point temperature of the substrate; and
    bringing the heated portion of the porous foam and the substrate together so that a portion of the substrate is heated sufficiently to melt or soften enough to infuse into pores of the foam and a remaining portion of the substrate structure is unchanged; and
    while holding the heated portion of the porous foam and the substrate together, allowing the heated portion of the foam to cool below the melting point temperature so that the heated portion of the substrate material solidifies, thereby creating a mechanical bond between the substrate and the foam.

2. The method of claim 1, wherein the substrate is a metal substrate, a thermoset conductive plastic substrate, or a composite substrate.

3. The method of claim 1, wherein the foam is graphite foam, metal foam, or ceramic foam.

4. The method of claim 1, wherein the substrate is made of aluminum and the porous foam is graphite foam.

5. The method of claim 1, wherein the porous foam is heated in a furnace, heated locally in an in-situ type process, or resistively heated.

6. The method of claim 1, further comprising applying a material between the porous foam and the substrate prior to pressing.

7. The method of claim 1, further comprising modifying the porous foam to mold into the substrate when brought together, or modifying the porous foam and the substrate to have engaging lock and key structures.

8. The method of claim 1, comprising pressing the heated portion of the porous foam against the portion of the substrate.

* * * * *